United States Patent

[11] 3,585,426

| [72] | Inventor | Harold R. Newell<br>South Newbury, N.H. |
|---|---|---|
| [21] | Appl. No. | 864,040 |
| [22] | Filed | Oct. 6, 1969 |
| [45] | Patented | June 15, 1971 |
| [73] | Assignee | Mesur-Matic Electronics Corporation<br>Warner, N.H. |

[54] VIBRATION COMPENSATION FOR WOBBLE PLATE STEP MOTORS
11 Claims, 5 Drawing Figs.

[52] U.S. Cl..................................................... 310/49, 310/82
[51] Int. Cl....................................................H02k 37/00
[50] Field of Search........................................... 74/60; 310/49, 82, 83

[56] References Cited
UNITED STATES PATENTS

| 3,474,272 | 10/1969 | Newell | 310/49 |
| 3,492,515 | 1/1970 | Foskett | 310/49 |
| 3,496,395 | 2/1970 | Newell | 310/46 |
| 3,341,725 | 9/1967 | Gifford | 310/82 X |

Primary Examiner—D. F. Duggan
Attorney—Hurvitz & Rose

ABSTRACT: A step motor has a wobble plate that wobbles about a shaft to produce meshing of circular gears fastened to the plate and to the shaft, respectively, in a sector that propagates about the entire length of the gears, under the influence of a stepping electromagnetic drive. The wobble plate is pivotally coupled to the shaft to undergo wobbling at an angle of inclination to the shaft that continuously rotates about the shaft, with relative rotation between plate and shaft occurring as a result of differing numbers of teeth on their respective gears. A second wobble plate identical to the first plate is pivotally coupled to the shaft at a point separated from the first wobble plate, and is associated with a set of gears identical to the first set of gears.

PATENTED JUN 15 1971

INVENTOR
HAROLD R. NEWELL

BY Hurvitz & Rose

ATTORNEYS

PATENTED JUN 15 1971 3,585,426

INVENTOR
HAROLD R. NEWELL

Hurwitz & Rose
ATTORNEYS

VIBRATION COMPENSATION FOR WOBBLE PLATE STEP MOTORS

BACKGROUND OF THE INVENTION

The present invention relates generally to step motors, and more particularly to step motors utilizing a wobbling rotor and to means for reducing vibration in such motors.

In copending application Ser. No. 627,419, entitled "Harmonic Drive for Digital Step Motors," filed Mar. 31, 1967, and of common assignee with this application, I disclose a synchronous step motor in which a rotor disc is electromagnetically actuated to wobble around a shaft according to a predetermined format of sequential switching or energization of the field windings of the motor. The rotor disc carries a pair of coaxial ring gears having teeth projecting from a plane parallel to the plane of the disc and cooperating with other ring gears, one of which is stationary and mounted to the motor housing and the other fastened to the shaft of the motor. The numbers of teeth on the cooperating gears differ so slightly that when the rotor disc wobbles around the motor shaft it rotates very slowly, or one pair of confronting gears may have the same number of teeth so that the disc undergoes no rotation relative to the motor housing, but does produce rotation of the gear fastened to the shaft, and with it, rotation of the shaft itself. Depending on the switching format of the field windings, the shaft is rotated in increments or steps, and may be caused to undergo such stepped rotation at very slow speeds up to and including extremely high speeds, in synchronism with the excitation of the windings.

In one embodiment of the wobble step motor of the aforementioned copending application, one pair of cooperating ring gears of the same diameter have teeth projecting from confronting planes, one of these gears fastened to the housing to remain stationary therewith, and the other fastened to or cut on a plane surface of the wobble disc adjacent the periphery of the disc. The disc is a magnetically permeable circular plate which is retained on the shaft for relative rotation therewith and for inclination at slight angles to a plane normal to the shaft. One of the ring gears, preferably that on the rotor, has one tooth less than the stationary gear, and when the planes of the two gears are perfectly parallel to one another the two gears are slightly separated. The housing contains a laminated annular magnetic core having a plurality of equiangularly spaced coils, corresponding to the desired number of motor phases, wound thereon. The motor shaft is mounted longitudinally along the motor axis for rotation in bearings retained in the housing. One end of the magnetic core confronts the rotor disc, and as the phases (field windings) of the motor are energized in the desired switching format, the disc is successively pulled toward each energized coil (or, more often, each pair of adjacent coils that are simultaneously energized). As a result, the teeth of the two outer ring gears mesh along only one relatively small sector at any given instant of time. As the energization of coils progresses, the rotor disc wobbles about the shaft. If the number of teeth is the same on both gears, there is no rotation of the disc, only what may be termed a sinusoidal wobble. If the two gears differ in number of teeth, relative rotation occurs between them, the direction of rotation of the disc relative to its direction of wobble depending on the tooth differential. For example, a fewer number of teeth on the disc gear than on the stationary gear will cause the disc to rotate that number of fewer teeth for each revolution of the wobble (i.e., each revolution of the meshed sector of the gears), in a reverse direction to that of the wobble. The second pair of ring gears includes an inner gear on the disc and a gear of matching diameter coupled to the shaft. These two latter gears have a tooth differential which is predetermined to produce shaft rotation in either direction depending on direction of revolution of the wobble.

Despite the unbalanced load on the shaft, the step motor operates quite efficiently and with great accuracy. However, a problem of vibration occurs, the severity of which depends upon the mass of the rotor disc and the angle of inclination of the disc from the plane normal to the shaft as the disc wobbles about the shaft. In particular, wobbling of the disc is accompanied by a reaction force, 180° out of phase with the wobble, on the motor frame or housing. The magnitude of this reaction force is directly proportional to the angle of wobble and to the ratio of the disc to the mass of the remainder of the motor. In some instances, the resulting vibration may be objectionable.

In another copending patent application, Ser. No. 664,331, entitled "Harmonic Drive for Digital Step Motor," filed Aug. 30, 1967, I disclose an improvement in the aforementioned wobble motor structure with the provision of a coupling point in the form of a universal joint between wobble plate (rotor disc) and motor shaft, that is free to move longitudinally along the shaft axis but is confined radially on the shaft. This permits the force exerted by the driving electromagnetic field to be divided substantially equally between the two sets of gears, despite the usual tolerances and deviations from complete accuracy that exist in the gears when new and that become further aggravated with wear of the gear teeth. As a result of this freedom of the wobble plate to adjust its alignment during operation, both sets of gears mesh accurately in the aforementioned wobble sector, with virtually no looseness or "play." As an added advantage, this reduces the magnitude of the reaction force on the motor frame, and hence the vibration. Nevertheless, vibration still exists, and it is the principal object of my present invention to eliminate or the substantially reduce such vibration in wobble plate step motors.

SUMMARY OF THE INVENTION

Briefly, according to my present invention a symmetrical stator core-coil combination is provided in the motor housing to permit the addition of a second wobble plate or rotor disc, with associated gears corresponding to those used with the first wobble plate, confronting the core end opposite that confronted by the first plate. As the coils are energized in the switching or driving format, the two plates wobble about the shaft at the same rate and in phase opposition to one another (in the sense that both plates are attracted to the same energized coils). Thus, the reaction force produced on the motor frame by each wobbling plate is virtually cancelled by the reaction force produced by the other wobbling plate, to eliminate or to greatly reduce vibration of the motor frame and of associated equipment which is so mounted as to ordinarily feel the effects of that vibration.

The stator structure comprises a hollow cylinder of spirally (toroidally) wound thin magnetic strip material which may or may not be grain oriented. In one embodiment of the invention the cylinder is slotted to a depth leaving a narrow web of material adjacent one end of the cylinder. Bobbins having the stator coils would thereon are placed on each of the poles created by the unslotted parts of the cylinder and the entire assembly is potted with certain other motor parts to provide a unitary structure. The unslotted web is then removed so that individual two ended poles are formed with each end of the pole cooperating with a different one of the two wobble plates.

In a second embodiment of the stator construction back-to-back stators are provided by slotting the aforesaid hollow cylinder from both ends to provide longitudinally aligned poles with an intermediate web. Bobbin wound coils are fitted to each pole, this providing twice the number of coils as in the first embodiment. The aligned coils of the two motors are magnetically arranged to induce opposing fluxes in the intermediate web to eliminate saturation effects in the web and reduce losses in the magnetic circuit.

It is an object of the present invention to provide a dynamically balanced wobble plate-type step motor.

It is another object of the invention to provide a wobble plate-type step motor, dynamically balanced by employing two wobble plates pulled toward one another during each step of the motor.

It is yet another object of the present invention to provide a stator for wobble plate-type steps motors employing a wound and slotted stator.

Yet another object of the present invention is to provide a method of fabricating a stator having two sets of opposed poles for use with two opposed wobble plates of a step motor.

BRIEF DESCRIPTION OF THE PREFERRED EMBODIMENTS

Figure 1:
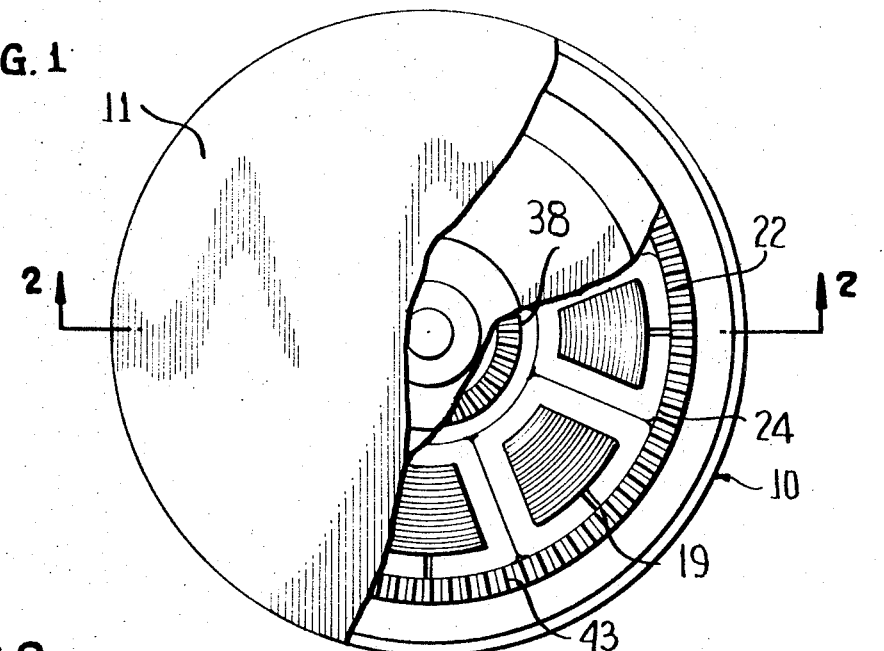
FIG. 1 is a plan view partly cutaway, of an embodiment of the step motor according to the present invention.
Figure 2:
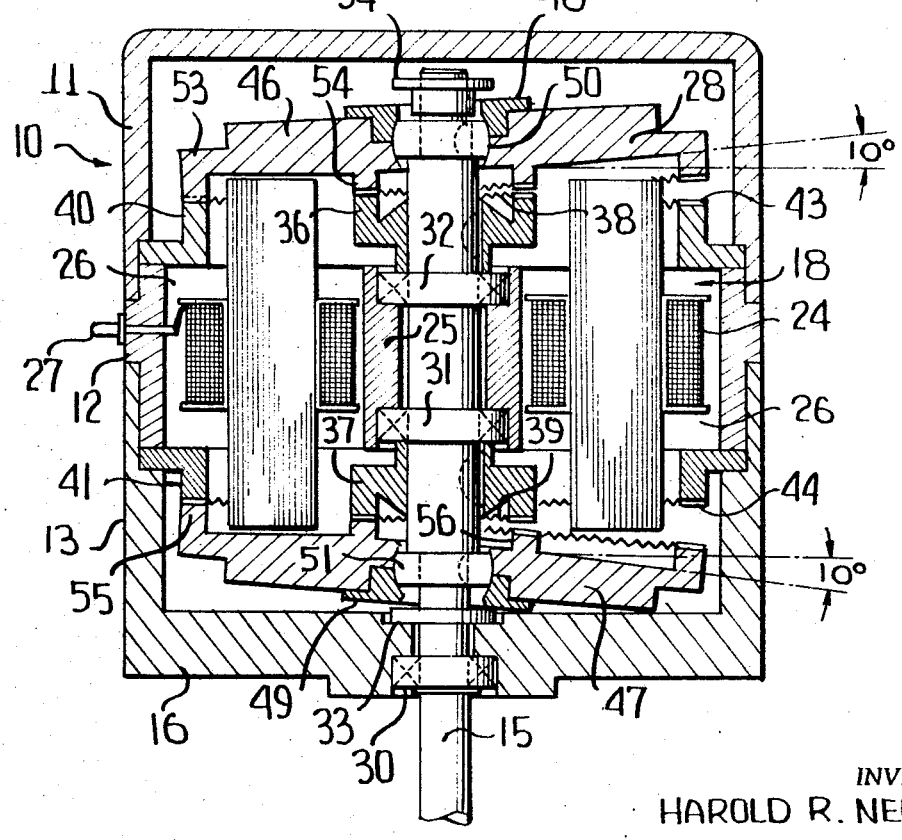
FIG. 2 is a sectional view of the motor taken along the lines 2—2 of FIG. 1.
Figure 3:
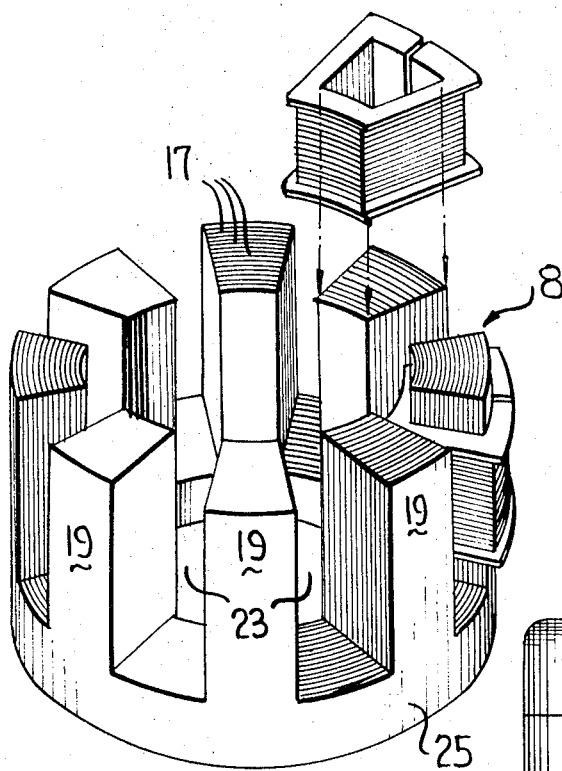
FIG. 3 is a perspective view in elevation of the pole arrangement of the motor of FIGS. 1 and 2.

Referring now to FIGS. 1—3 of the accompanying drawings, the step motor has a housing 10, composes of an upper section or cover 11, a midsection 12 and a lower section 13, all of which are composed of any suitable nonmagnetic material. The terminology "upper" and "lower" is used only for the sake of clarity in designating the components as they appear in FIG. 2, and is not intended to specify a critical orientation of the motor. The motor sections fit together to form a closed cylinder, with a shaft 15 extending through an axial hole in end wall 16 of section 13.

The stator core 18 is composed of a thin lamination 17 of magnetic material wound to form a hollow toroid of sufficient radial thickness to provide the necessary stator poles. Referring to FIG. 3 the hollow toroid is slotted radially at locations 23 to the desired depth to form the poles 19 of the stator; there being 8 such poles as illustrated in FIG. 1. The coils 24 are formed preferably by winding on bobbins 20 which are then positioned about each of the poles thus formed. The coil-core assembly is now potted within the housing midsection 12 (see FIG. 2) with a central bearing tube 25 held centrally thereof by bearings 31 and 32. A strong epoxy resin 26 may be used in the potting process. Thus a unitary structure is created comprising an outer shell, the housing midsection 12, an inner shell, the bearing tube 25 and the core-coil assembly appropriately positioned and rigidly supported therein.

At this stage of construction, individual poles have not been created since the toroid of magnetic strip material was slotted leaving a web 25 of magnetic material interconnecting one end of each of the poles. This web may now be removed, (as by sawing) and the structure assumes the form of FIG. 2 with each pole 19 physically and magnetically distinct from each of the other poles 19.

Although the dual wobble plate step motor of the present invention is not restricted to use of a stator conforming to the aforesaid arrangement, such an arrangement and method of manufacture thereof has been found to be most efficient and quite economical to manufacture.

Returning now to the apparatus of FIGS. 1 and 2, coil terminals 27 (FIG. 2) extend through midsection 12 to permit connection of the windings to the driver circuitry (not shown) for the motor. It will be observed that the overall stator is symmetrical, particularly in that the two ends of each core (pole faces) are identical and project the same distance from the respective potted assembly surfaces.

Shaft 15 extends into motor housing 10 along the longitudinal axis and is mounted for rotation in bearings 30, 31, and 32, respectively retained in a recessed central hole in lower housing section 13 and at either end of bearing tube 25. A retaining ring 33 prevents the shaft from moving outwardly of housing 10 and a further retaining ring 34 is press fitted on the shaft at its other end within the housing.

Pinned or otherwise suitably fastened to shaft 15 at either side of the stator assembly (and bearings 31, 32) is a pair of identical upper and lower circular ring gears 36, 37 having respective teeth 38, 39 cut therein. A further pair of identical stationary upper and lower circular ring gears 40, 41 are fastened to housing 10 between sections 11, 12 and 13, respectively, these gears having respective teeth 43, 44 cut therein, and being somewhat lower (relative to the midsection) than the teeth on the shaft gears.

First and second rotor discs or wobble plates 46, 47 of magnetically permeable material are pivotally coupled to shaft 15 adjacent either end of the stator and have respective bearing cups 48, 49 fastened in recessed holes in the plates. The bearing cups serve to hold their respective rotors (wobble plates) to longitudinally slidable universal joints 50, 51 respectively, preferably of the type described in my aforementioned patent application Ser. No. 664,331. With such joints or coupling members the rotors can undergo rotation relative to the shaft and can pivot to assume a cocked position at a slight angle (approximately 1°) to the shaft.

Each rotor disc is provided with a respective pair of coaxial ring gears 53, 54 and 55, 56 to cooperate with gears 40, 36 and 41, 37 respectively. Each of the ring gears is of substantially equal diameter to the gear with which it is to mesh, and each of the gears in the outer pairs of cooperating gears 40, 53 and 41, 55 respectively, preferably has the same number of teeth as the other gears in that set. Each of inner gears 54 and 56 on the respective rotor discs preferably has one more tooth than its respective shaft gears 36 and 37, although this is not critical except that the teeth differ in number between shaft gear and respective disc ring gear. It is to be emphasized that the gears, the gear teeth, the gear ratios, the rotor discs, and in short, everything pertaining to the rotor, gear and stator structure on one end of the stator is identical to the corresponding structure on the other end of the stator. It is also emphasized that the structure corresponds in pertinent part to that disclosed in my aforementioned copending patent application Ser. No. 664,331, with the exception of the stator core-coil assembly and symmetry and the additional rotor disc and associated gears, and therefore, reference is made to that application for any further details of structure that may be desired. The annular surfaces, 52 of the lower wobble plates 47 and 57 of the upper wobble plate 46 subsisting between ring gears 55 and 56 and 53 and 54, respectively, is inclined at a slight angle (preferably about 1° as illustrated in FIG. 2) to the plane of their wobble plates to permit the plates to wobble without interference with the ends of the poles 19.

In operation, the field windings are selectively energized by a driving circuit (not shown) according to a predetermined sequential switching format (commonly, a format in which adjacent windings are energized two at a time in sequence; such as, poles 1–2, 2–3, 3–4 etc.), the rotor discs being pulled together toward the energized windings in the same sequence, as is depicted in FIG. 2 for one position of the discs. Thus, the stationary outer gear and the disc outer gear of each pair mesh along a limited sector and this sector in which the gears mate, propagates with the switching format as the respective rotor wobbles about shaft 15 in response to the energization of coils in that format. Since these gears have the same number of teeth, however, there is no relative rotation between rotors and housing, only wobbling of the rotors in opposition about the shaft. The slight angle at which the surfaces 52 and 57 of the plates are inclined with respect to the plane of the plates, permits rotor wobble to occur without interference between the rotor and the poles. Moreover, the relative longitudinal positions of the teeth of the inner and outer gears conform to this angle, i.e., the teeth are cut at an angle, to permit both inner and outer gears to mesh along the same limited sector, as the respective rotors wobble about the shaft.

For one more tooth on each of the inner rotor gears than is present on each of the shaft gears, the shaft gears rotate, in response to wobbling of the rotors about the shaft in a direction opposite the direction of wobble and at a rate equal to the wobble rate divided by the number of teeth on the shaft gear. If the pivotal joint by which the rotor is coupled to the shaft is permitted longitudinal freedom and is radially confined, as is preferably provided here, the force exerted by the electromagnetic field is evenly divided between the two sets of gears, without play.

Ordinarily, with but a single rotor disc, a wobble plate step motor is subjected to substantial vibration as the rotor disc wobbles about the shaft, particularly in those instances where the rotor has a large mass and the angle of inclination during wobble is large. The vibration may be attributed to a reaction force on the motor frame which is 180° out of phase with the wobbling contact. With a dual rotor arrangement as described above, however, the two rotors wobble about the shaft at the same rate, and are mirror images of one another, so that the reaction force on the motor frame and associated components attributable to one is virtually cancelled by the other.

Vibration compensation does not require the use of a single symmetrical stator of the type shown in FIG. 2. Rather, a pair of stators may be positioned back-to-back, or with a sheet or layer of magnetically impermeable material therebetween. Although each stator may take any desired form compatible with step motor operation of the type thus far described, the stator configuration as shown and described in my copending application Ser. No. 717,838, entitled "Stator for Wobbling Rotor Step Motor," filed May 9, 1968, now U.S. Pat. No. 3,474,272, and commonly assigned herewith, may be employed. Each stator core element is composed of a plurality of laminated U-shaped sheets of magnetically permeable material with progressively increasing leg widths in, for example, three steps. The core elements may be juxtaposed in appropriate polyhedral configuration by bonding them in the annular slots of a mounting plate, using epoxy cement or other suitable bonding material. Coils may be positioned on adjacent legs of each juxtaposed pair of core elements. If the mounting plate is composed of magnetically impermeable material, the spacer plate need not be used.

Figure 4:
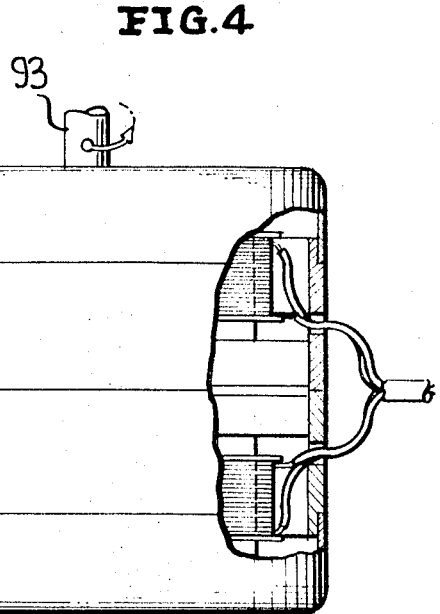
FIG. 4 is a side view, partly in section, of a pair of stators for use with respective ones of the rotor discs in place of the single symmetrical stator arrangement of FIGS. 1 and 2.

The arrangement of FIG. 4 requires that the coils of the two stators be energized in synchronism (preferably connected in parallel) in the desired sequential format so that the rotor discs associated with the stators wobble about the shaft in continual opposition.

Preferably and in accordance with still another feature of the present invention, a dual stator arrangement, where desired, is achieved with the same basic stator concept of FIG. 3. Referring specifically to FIG. 4 of the accompanying drawings there is provided a hollow cylinder 70 of helically wound magnetic strip material. The cylinder 70 is slotted at both ends to provide upper and lower groups of poles 71 and 72, preferably 8 in each group, with a pole in each group longitudinally aligned with a pole in the other group.

The slots 73 and 74 defining the poles, terminate a predetermined distance from one another to define a web 76 of magnetic material disposed between the poles. Bobbin-wound stator coils 77 are disposed about each pole and the entire structure potted between inner and outer cylindrical members (as in FIG. 2) to complete the stator structure. The coils 77 are energized such that the flux from longitudinally aligned coils cancel out in the web 76. For instance, when coils associated with aligned poles 71 and 72 are connected via leads 75 and 80 as illustrated, they develop flux in the web 76 as indicated by the arrows 78 and 79, respectively. The reason for this arrangement is so that the web 76 may be narrow without introducing a high reluctance path into the magnetic circuit, thereby minimizing the amount of high cost magnetic material required without penalizing the performance of the magnetic circuit.

Figure 5:
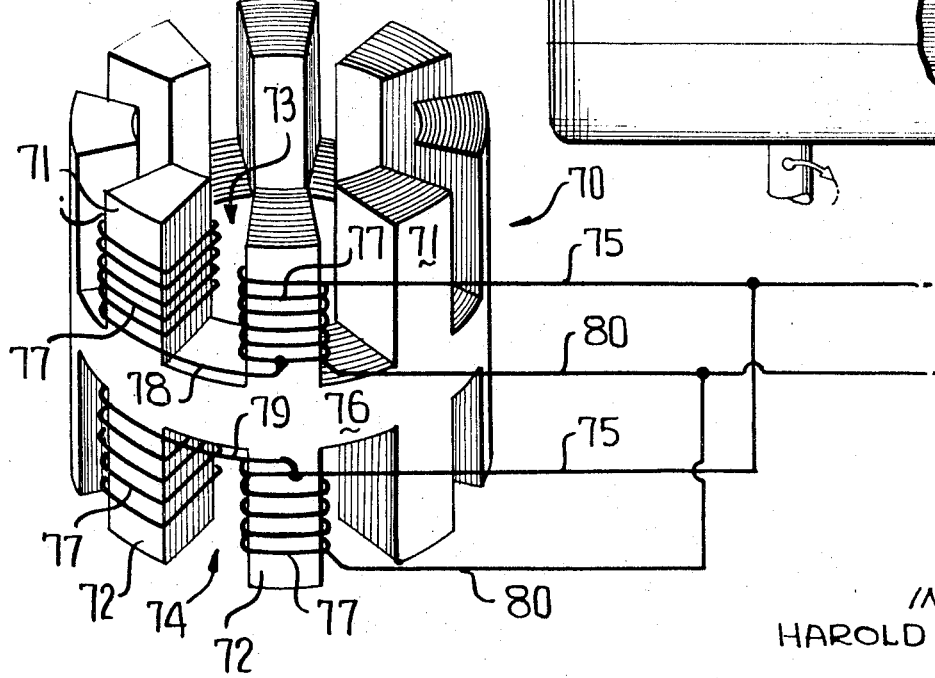
FIG. 5 is a perspective view in elevation of the pole arrangement of the back-to-back motor arrangement of a further embodiment of the present invention.

In all other details the motor of FIG. 5 may conform to the motor of FIGS. 1 and 2, employing dual wobble plates and related structures to achieve the desired results of a physically balanced stepping motor having little vibration.

I claim:

1. A step motor comprising a pair of cooperating ring gears having a normally common axis and having confronting teeth projecting from normally spaced generally parallel planes, stationary electromagnetic means for selectively deflecting consecutive portions of the ring of one of said gears relative to the other to cause tilting of the axis of said one gear relative to the axis of the other and thereby provide meshing of the teeth of said gears only along a moving limited sector of both gears, said sector undergoing movement as the portions at which said gear is deflected are successively changed, a shaft connected to said other gear along the axis of said other gear, said gears having different numbers of teeth whereby continued deflection of said consecutive portions of said one gear into mating engagement with the other gear in a moving sector throughout the length of said gears is accompanied by relative rotation of said shaft, and means including a tilting mechanism responsive to said electromagnetic means for deflection toward said one gear for reducing vibration accompanying said deflection of said gears, said stationary electromagnetic means being disposed between said one gear and said tilting mechanism.

2. The invention according to claim 1 wherein said vibration reducing means comprises a further pair of gears identical to and subjected to deflection at the same rate as the first pair of gears and in a direction counter to the direction of deflection of said first pair of gears while following the same direction of movement of said sector as said first pair of gears.

3. The invention according to claim 2 wherein said first and further pairs of gears are annular, sharing a common axis, and wherein one gear of each pair of gears is mounted on a respective magnetically permeable disc; and means pivotally coupling each of said discs to spaced-apart points on said shaft for wobbling about said shaft in response to said continued deflection, the other gear of each pair of gears being fastened to said shaft.

4. A step motor comprising
a shaft,
at least one pair of cooperating substantially planar ring gears having confronting teeth and having a common axis with said shaft,
a wobble plate supporting one of said gears,
means pivotally coupling said wobble plate to said shaft for relative rotation therewith and for inclination at an angle to a plane normal to said shaft,
means fastening the other gear to said shaft for fixed rotation therewith,
electromagnetic stator means having pole faces arranged coaxial with said shaft, said first wobble plate disposed in a plane parallel to the plane of said pole faces and displaced axially therefrom,
said first wobble plate pivoting at sinusoidally varying angles of inclination about said shaft in response to energization of said stator means to force successive portions of said gears into mating engagement with one another, said gears having different numbers of teeth whereby mating of successive portions thereof is accompanied by relative rotation of the gears, and
a further wobble plate pivotally coupled to said shaft on a side of said stator means remote from said first wobble plate and responsive to energization of said stator means to follow the movement of the first wobble plate about said shaft at opposite sinusoidally varying angles of inclination, to reduce vibration of said first wobble plate.

5. The step motor according to claim 4 wherein is further provided a second pair of cooperating substantially planar ring gears identical to the first-named pair of gears and having a common axis with said shaft, said further wobble plate supporting said one gear of the second pair of gears, and other gear of the second pair of gears fastened to said shaft for fixed rotation therewith, and means pivotally coupling said further wobble plate to said shaft at a point axially separated from the point of pivotal coupling of said first plate for rotation relative to said shaft and for inclination at said angle.

6. The combination according to claim 4 wherein said stator means comprises a helically wound strip of thin magnetic material defining a hollow cylinder having two end surfaces generally perpendicular to the axis of said cylinder, a plurality of spaced slots formed in each of said end surfaces, each of said slots in one of said end surfaces being axially aligned with a slot in the other of said end surfaces, said slots in said one end surface defining equal angles therebetween, said slots having an axial length defining a continuance, circumferential web of helical wound magnetic material adjacent the longitudinal center of said cylinder thereby defining a plurality of pairs of oppositely directed magnetic poles.

7. A step motor according to claim 6, further comprising a plurality of coils of wire each disposed about a different one of said poles and means connecting coils associated with longitudinally aligned magnetic poles to develop flux of opposite polarity in said web upon energization of said coils.

8. The combination according to claim 4 wherein said stator means comprises a helically wound strip of thin magnetic material defining a hollow cylinder having two end surfaces generally perpendicular to the axis of said cylinder, a plurality of spaced slots formed in one of said end surfaces, said slots in said one end surface defining equal angles therebetween, said slots having an axial length defining a continuance, circumferential web of helical wound magnetic material adjacent the other end of said cylinder, the axis of said cylinder being coaxial with said shaft.

9. In combination,
a plate having an axis of rotation,
means pivotally supporting said plate for inclination relative to said axis through a limited angle in any radial plane containing said axis,
a drivable member,
force transmitting means coupled to said plate for driving said drivable member,
electromagnetic stator means disposed symmetrically with respect to said axis and axially displaced from said plate, said stator means effective, when energized, to selectively wobble said plate at an angle of inclination that rotates about said axis, and
a further plate having said axis of rotation and located along said axis on a side of said stator means remote from said first named plate for undergoing counterwobble about said axis at an angle of inclination in synchronous rotation with and in a direction opposite that of the angle of inclination of the first-named plate, to reduce the vibrational effect of a single wobbling plate.

10. The combination according to claim 9 further including
a step motor including said first-named plate,
said drivable member comprising a rotatable shaft of said motor, and
said stator means comprises separate electromagnetic stators, each of said plates comprising a magnetically permeable rotor.

11. The combination according to claim 9 further including
a first step motor including said first-named plate, said drivable member, said force transmitting means, and said selective wobble means, and
a second step motor substantially identical to said first step motor, and including said further plate,
said first and second step motors sharing a common axis of symmetry corresponding to said axis of rotation.